Nov. 15, 1966   M. E. STANFORD   3,286,232

DIGITAL COMPARATOR CLASSIFYING DEVICE

Filed Nov. 3, 1961   6 Sheets-Sheet 1

RANGE SWITCH

INVENTOR.
MELVIN E. STANFORD,
BY James G. Williams
HIS ATTORNEY.

United States Patent Office 3,286,232
Patented Nov. 15, 1966

3,286,232
DIGITAL COMPARATOR CLASSIFYING DEVICE
Melvin E. Stanford, Scotia, N.Y., assignor to General Electric Company, a corporation of New York
Filed Nov. 3, 1961, Ser. No. 149,931
2 Claims. (Cl. 340—146.2)

The invention relates to a classifying device, and particularly to a classifying device for classifying an unknown magnitude in or into one of a plurality of divisions between upper and lower reference magnitudes.

Manufacturers, particularly manufacturers of electrical products, are presently using automatic testing apparatus for testing the operation of such manufactured products. This testing apparatus imposes one or more conditions on the products being tested and then derives output information indicative of the operation of the products during the test. Quite often, this output information is in the form of an electrical signal which may be indicated by a meter or by various indicator lights. In order that the operation of the products under test can be ascertained or evaluated, it is necessary to have an operator evaluate the electrical signal and determine whether or not the products being tested are satisfactory. While such an evaluation is satisfactory in many aspects, it is subject to human error, fatigue, delay, and subjectivity.

Accordingly, an object of the invention is to provide a classifying device which receives unknown signal magnitudes and classifies these unknown signal magnitudes in a plurality of divisions between upper and lower reference signal magnitudes.

Another object of the invention is to provide a classifying device which receives test information or results in the form of unknown signal magnitudes, and classifies these signal magnitudes in any one of a plurality of predetermined divisions so that the test information or results may be automatically and easily evaluated.

Briefly, and in accordance with the invention, an unknown signal magnitude (which may be representative of any function, operation, or test result) is compared with a selected reference signal magnitude. The selected reference signal magnitude may be selected from a plurality of reference signal magnitudes which may be provided by a plurality of divisions between upper and lower reference limits. The upper and lower reference limits are determined by the range in which the unknown signal magnitude should fall. If the selected reference signal magnitude exceeds the unknown signal magnitude, down pulses are first produced and utilized to select a reference signal magnitude below the unknown signal magnitude, and then up pulses are produced and utilized to select a reference signal magnitude which just exceeds the unknown signal magnitude. When this result is attained, an indication of the finally selected reference signal magnitude is given. The indication given may be used in any way desired, such as for classifying the results of the test from which the unknown signal magnitude has been derived. If, however, the unknown signal magnitude initially exceeds the reference signal magnitude, only up pulses are produced and utilized to select a reference signal magnitude which just exceeds the unknown signal magnitude. As before, an indication of the finally selected reference signal magnitude is then given. The accuracy of this classification may be controlled by the number of reference divisions utilized and the upper and lower reference limits selected.

The invention will be better understood from the following description given in connection with the accompanying drawing, and its scope will be pointed out in the claims. In the drawing:

*Functional or over-all description*

While the specification does not include or describe a specific type of test apparatus or system, it is to be understood that the classifying device of the invention can be used with many types of such test apparatus or systems. It might be mentioned that all of the functions of the classifying device may be either manual or automatic. If the operation is automatic, it may be tied in or related to the operation of the test device. However, the automatic or manual operation is an optional arrangement, and does not form an essential part of the invention. It is not essential that such test apparatus or system be automatic, but such an automatic test apparatus or system is preferred since it may be operated in accordance with a predetermined program which may control the tests to be made and which may also control such tests in accordance with the result provided by the classifying device of the invention. The classifying device, as will be explained, contemplates the use of direct current voltages for the test results or the unknown signal magnitudes. If the test apparatus or system does not provide such direct current voltages, persons skilled in the art will appreciate that other signals may be used by appropriate modification or the test results may be readily converted to direct current voltages for the classifying device shown.

Figure 1:
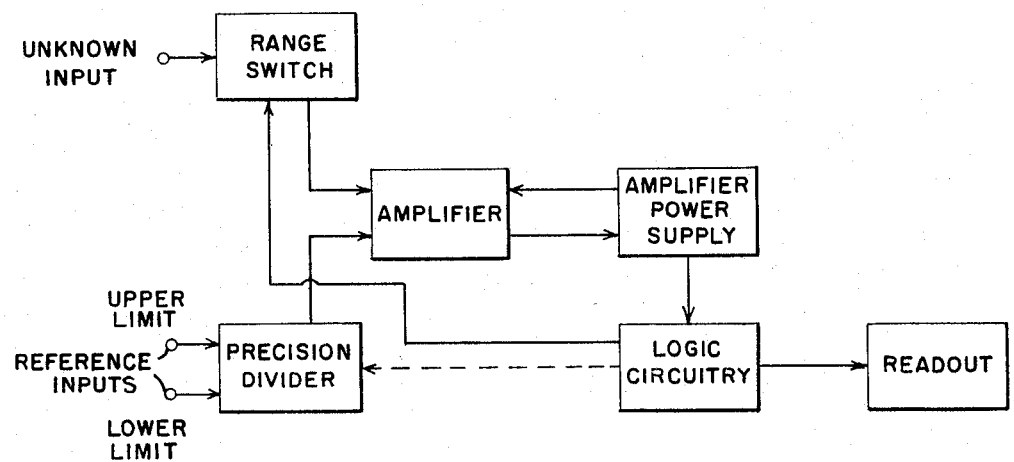
FIGURE 1 shows an over-all block diagram of a classifying device in accordance with the invention.

With reference to FIGURE 1, these test results are applied as an unknown input to a range switch. The range switch provides any necessary reduction of the unknown signal magnitude so that the output voltage supplied by the range switch to the amplifier does not exceed a desired magnitude, say ten volts. Direct current voltages representing the predetermined or desired upper and lower reference limits of the test results are applied across a precision divider. These upper and lower reference limits may be controlled by the predetermined programmed information applied to the test device. The precision divider divides the upper and lower reference limits into a number of divisions or cells, in a preferred embodiment 30 divisions. Each of these divisions represents some signal magnitude between the upper and lower reference limits. Any one of these divisions may be selected by a variable selector and also applied to the amplifier as the reference signal.

The amplifier compares the relative magnitudes of the unknown and the reference signals supplied to it, and produces up or down pulses in response to the greater of the unknown and reference signal magnitudes. These pulses are amplified to the necessary level by an amplifier power supply. If the reference signal magnitude exceeds the unknown signal magnitude, down pulses are produced by the amplifier. However, if the unknown signal magnitude exceeds the reference signal magnitude, then up pulses are produced by the amplifier. These pulses are further amplified by the amplifier power supply and applied to logic circuitry. If the reference signal magnitude exceeds the unknown signal magnitude, the down pulses, when applied to the logic circuitry, cause the logic circuitry to sequentially select lower reference signal magnitudes until the selected reference signal magnitude is below the unknown signal magnitude. Subsequently, since the unknown signal magnitude now exceeds the reference signal magnitude, up pulses are produced to cause the logic circuitry to sequentially select higher reference signal magnitudes until the selected reference signal magnitude just exceeds the unknown signal magnitude. At this point, the reference signal magnitude which meets these conditions may be read out or utilized in any way desired. If the unknown signal magnitude initially exceeds the reference signal magnitude, only up pulses are produced to cause only the operation just described to be performed.

In the preferred embodiment to be explained in detail, the down pulses select lower reference signal magnitudes in steps or divisions of five, while the up pulses select higher reference signal magnitudes in steps or divisions of one. Also in the preferred embodiment, 30 divisions are provided between the reference limits, and the home position of the reference signal magnitude is the 25th division counting upward from the lower reference limit. For this reason the down pulses preferably provide steps or divisions of five, and the up pulses preferably provide steps or divisions of one. These are matters of design and choice. If the unknown signal magnitude is greater than the reference signal magnitude, the up pulses provide steps of one division. If the unknown signal magnitude is less than the reference signal magnitude, then the down pulses provide steps of five divisions until the reference signal magnitude is below the unknown signal magnitude. After this, the up pulses provide steps of one division until the reference signal magnitude again just exceeds the unknown signal magnitude.

With the functional operation having been described, the sequential operation of the classifying device will be described. First, upper and lower reference limits are applied to the precision divider. The precision divider divides the voltage between the upper and lower reference limits into a plurality of divisions, in a preferred embodiment 30 equal divisions. If there are 30 such divisions, they may be arbitrarily designated 1 through 30, beginning with division 1 at the lower limit. The home reference signal magnitude is the 25th division (from the lower limit) for the case of 30 divisions. At approximately the same time the reference limits are applied to the precision divider, the unknown signal magnitude may be applied to the range switch. With the unknown signal magnitude applied to the range switch, the range switch is then operated to produce the proper range of signal for the amplifier. This may be done either automatically or manually. The range switch divides or attenuates the unknown signal magnitude by a factor of one, or a factor of ten, or a factor of 100, depending upon the magnitude of the unknown signal.

With the unknown signal magnitude and the reference signal magnitude applied to the amplifier, up or down pulses are produced in response to the relative magnitudes. If the reference signal magnitude is initially higher than the unknown signal magnitude, down pulses are produced to cause the precision divider output to move downward at the rate of five divisions per down pulse. These down pulses continue until the reference signal magnitude is lower than the unknown signal magnitude. After this, up pulses are then produced and the precision divider moves or responds to these up pulses at the rate of one division per pulse. This operation continues until the reference signal magnitude just exceeds the unknown signal magnitude, after which all operations cease or stop. Then the location of the precision divider is indicated and/or utilized in any way desired. If initially the unknown signal magnitude exceeds the reference signal magnitude, up pulses are initially produced so as to move the precision divider at the rate of one division per up pulse. These up pulses continue until the reference signal magnitude just exceeds the unknown signal magnitude, after which (and as described for the other case) all operation stops or ceases, and the position of the precision divider is utilized or read out in any manner desired. After the information is utilized or read out, a reset pulse is provided, either manually or automatically, to return the precision divider to its home or initial position so that the classifying device is ready to consider another unknown signal magnitude.

With the above functional and sequential operation in mind, the various components shown in the block diagram of FIGURE 1 will now be described in detail.

*Range switch*

Figure 2:
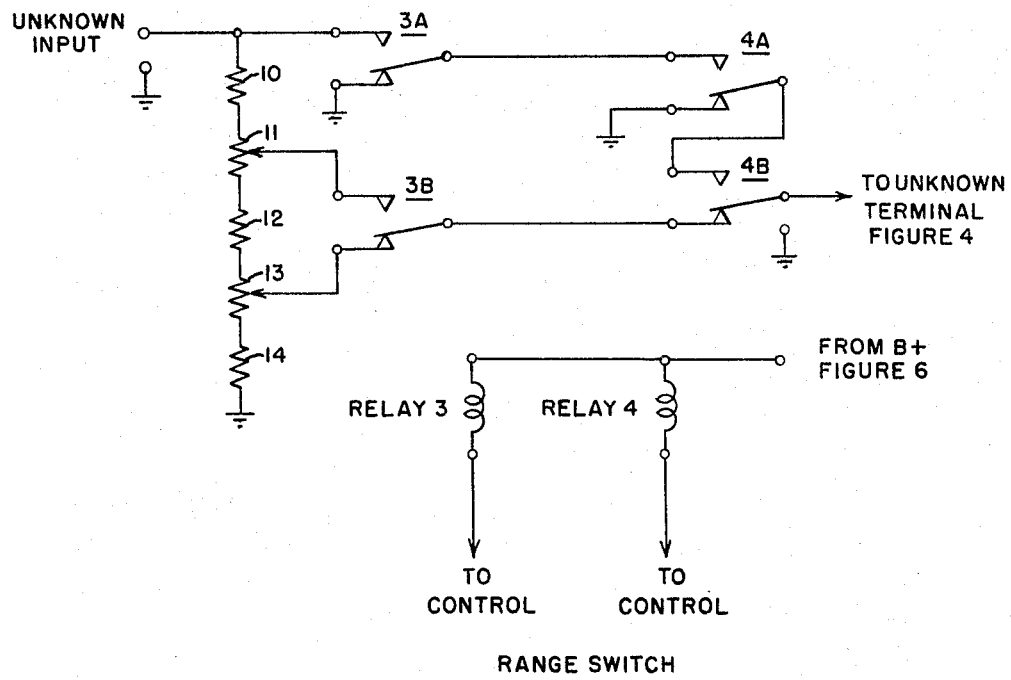
FIGURE 2 shows a schematic diagram of one embodiment of a range switch for unknown signal magnitudes which may be used in the block diagram of FIGURE 1.

The range switch is provided to reduce the unknown signal magnitude to a magnitude within the range of operation for which the amplifier is designed. In the embodiment contemplated, the range switch is capable of dividing the unknown signal magnitude by a factor of 1, 10, or 100. Other factors may be provided, and the range switch may be modified to multiply as well as or instead of divide. The schematic diagram of the range switch is shown in FIGURE 2. The unknown signal magnitude is applied to the input terminals, one of which may be grounded as shown. A voltage divider comprising a plurality of resistors 10, 11, 12, 13, 14 is provided between the input terminals, and a portion of the voltage or all of the voltage across these resistors is selected by the contacts of two relays, designated relay 3 and relay 4. The coils of relay 3 and relay 4 are energized by a source of potential, B+, which is derived from the circuitry of FIGURE 6 and which is controlled in any desired manner. In FIGURE 2, this control is merely indicated, but is not shown. This control may be either manual or automatic and would complete the energizing path for the coil or coils of relay 3 and relay 4. The respective contacts of the relays shown in FIGURE 2 (as well as subsequent figures) are designated with the relay number followed by a letter. Thus contacts 3A and 3B are associated with relay 3, and contacts 4A and 4B are associated with relay 4. The contacts as shown in FIGURE 2 are in their normal position, that is the position which they take when the relay coils are not energized. Two of the resistors 11, 13 are provided with adjustable taps for adjusting the magnitudes of derived signals. The resistors 10, 11, 12, 13, 14 have values (which may be conventionally calculated or determined) such that the magnitude of the tap on the resistor 13 is one-hundredth the unknown signal magnitude and the magnitude of the tap on the resistor 11 is one-tenth the unknown signal magnitude. If neither of the coils of relay 3 and relay 4 are energized, the unknown signal magnitude is divided by 100. This is derived from the tap on the resistor 13 and is applied through the normal position of the contacts 3B and 4B to the output which goes to the amplifier of FIGURE 4. If the coil of relay 3 is energized, the unknown signal magnitude is divided by 10. This is derived from the tap on the resistor 11 and is applied through the energized position of the contacts 3B and the normal position of the contacts 4B to the output. If both coils of relays 3 and 4 are energized, the full unknown signal magnitude is derived through the energized position of the contacts 3A, 4A, and 4B.

*Precision divider*

Figure 3:
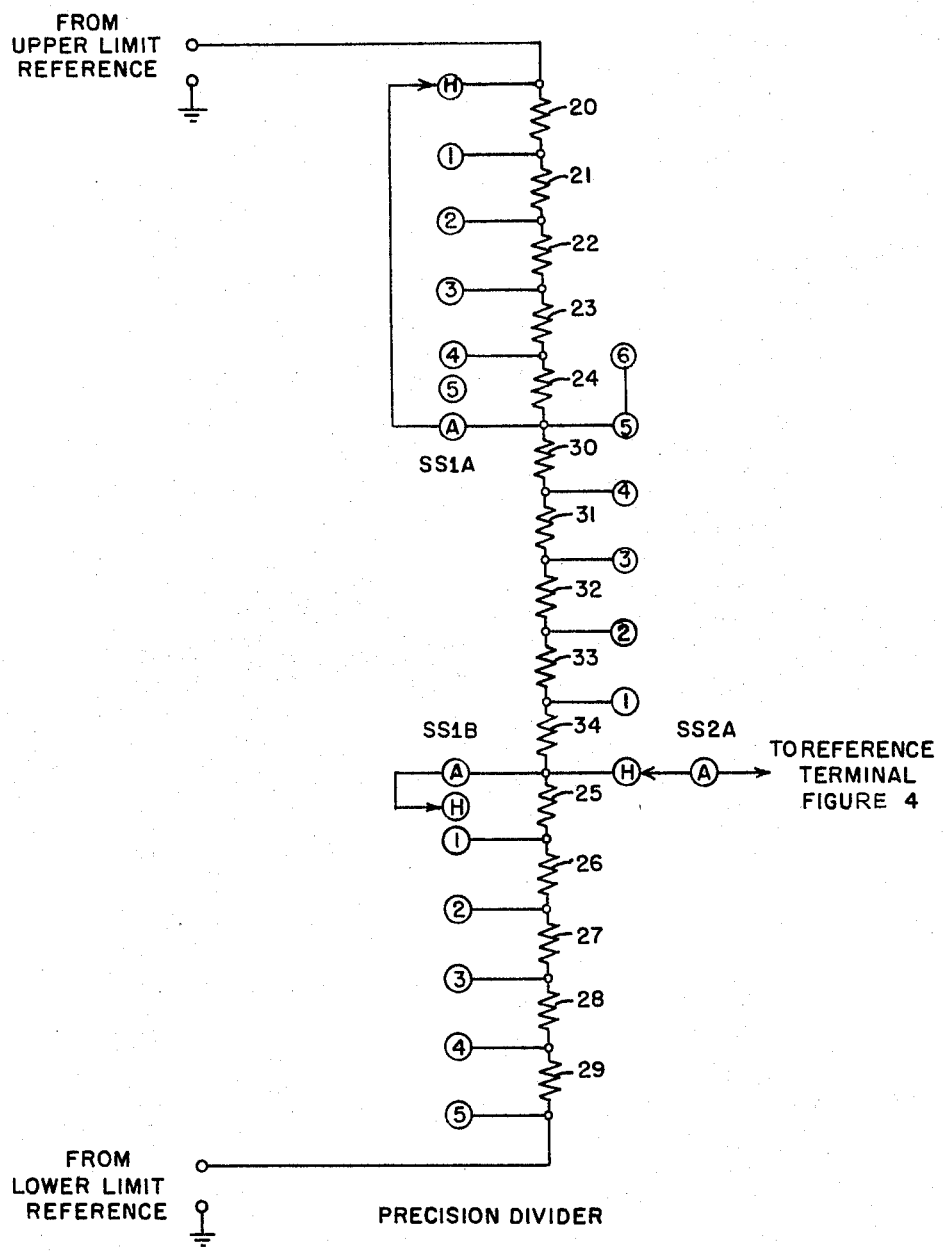
FIGURE 3 shows a schematic diagram of one embodiment of a precision divider for reference signal magnitudes which may be used in the block diagram of FIGURE 1.
Figure 6:
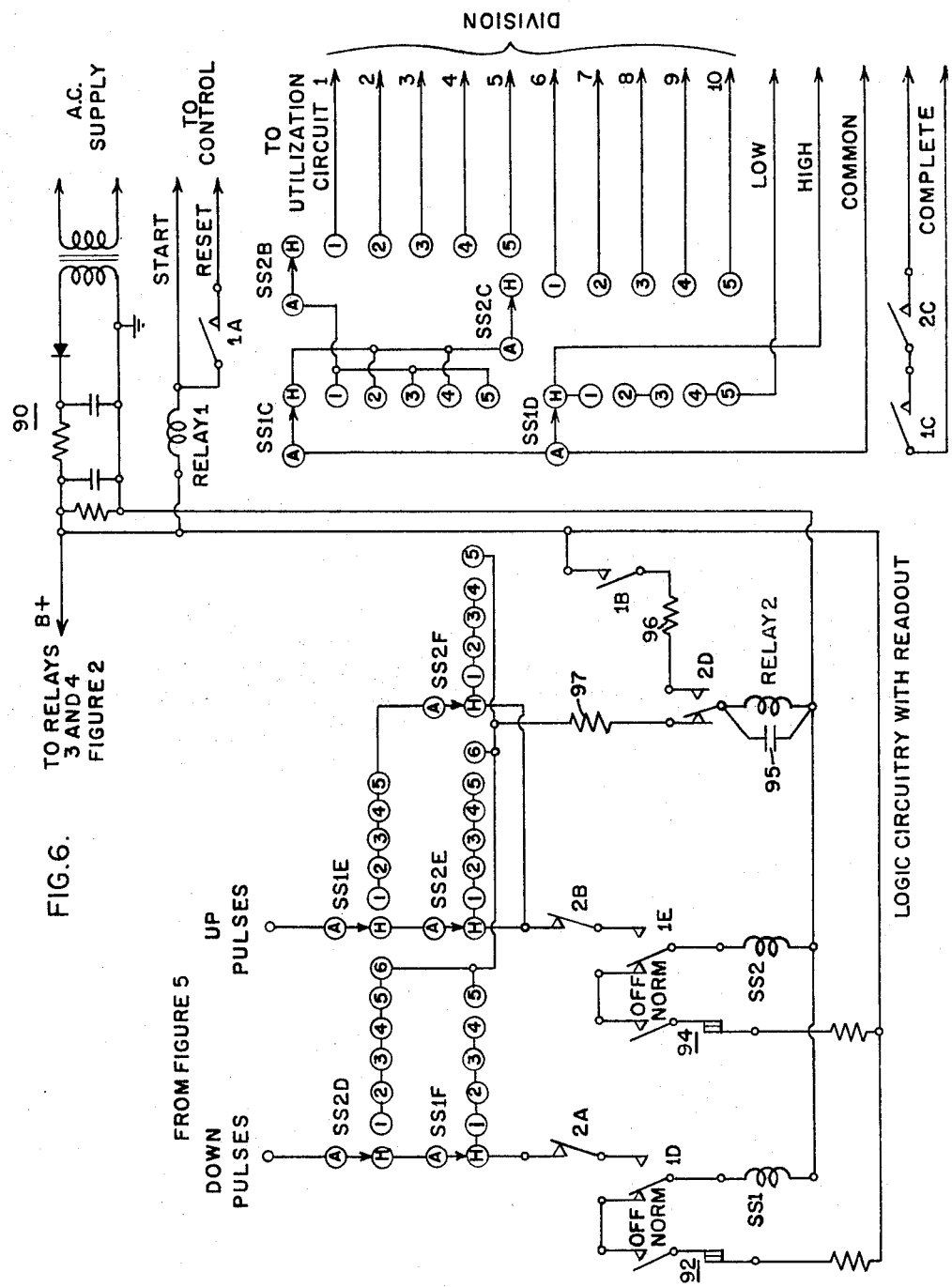
FIGURE 6 shows a schematic diagram of one embodiment of logic circuitry which may be used in the block diagram of FIGURE 1.

The schematic diagram of the precision divider is shown in FIGURE 3. The divider comprises two terminals. The upper limit reference signal is supplied to one terminal, and the lower limit reference signal is supplied to the other terminal. A ground terminal may also be provided. A series of relatively precise resistors 20 through 29 and 30 through 34 are connected between the upper limit reference signal terminal and the lower limit reference signal terminal. The resistors 20 through 29, in a preferred embodiment, have a magnitude five times greater than the resistors 30 through 34. The reason for this will be explained subsequently. The output voltage from the precision divider is derived by an arm SS2A of a stepping switch SS2. In FIGURE 3, as well as in the other figures, a stepping switch is designated SS, followed by its number, and may be followed by a letter indicating the particular arm associated with that stepping switch. The actuating coils for the stepping switches SS1 and SS2 are shown in FIGURE 6. The output is applied to the reference terminal of the amplifier shown in FIGURE 4. There are six numbered positions and a home position H for the arm SS2A. Arms SS1A and SS1B of stepping switch SS1 are also utilized as shown in FIGURE 3. There are five numbered positions and a home position H for each of the arms SS1A and SS1B. The resistors of the precision divider are arranged with five of the higher magnitude resistors 20 through 24 and 25 through 29 on either side of the lower magnitude resistors 30 through 34. Arms SS1A and SS1B are respectively coupled to the junctions of the higher and lower magnitude resistors.

If the resistors 20 through 29 have an impedance of 5,000 ohms and the resistors 30 through 34 have an impedance of 1,000 ohms, it will be seen that if the arms SS1A, SS1B and SS2A are in their home position, there is an impedance of 25,000 ohms between the output and the lower limit reference terminal, and 5,000 ohms impedance between the output and the upper limit reference terminal. If 1,000 ohms impedance is considered to be one division, it will be seen that there are 30 divisions between the upper and lower limit reference terminals at all times. This results from the fact that five of the higher magnitude (5,000 ohms) resistors are short circuited and five are not short circuited, the conditions being determined by the positions of the arms SS1A and SS1B; and from the fact that the five lower magnitude (1,000 ohms) resistors are never short circuited. With the three arms SS1A, SS1B, and SS2A in their home positions as shown, the output is between division 25 and 26 (counting from the lower limit reference terminal). In terms of impedance the output is at a point 5,000 ohms below the upper limit reference terminal and 25,000 ohms above the lower limit reference terminal.

The stepping switch SS1 is operated by down pulses. As it is so operated, the impedance and hence the voltage between the output and the lower limit reference terminal is reduced and the impedance and voltage between the output and the upper limit reference terminal is increased. This is done in steps of one resistor at a time. As the stepping switch SS1 is operated, the arm SS1A unshorts one of the resistors 20 through 24 at a time, and the arm SS1B shorts one of the resistors 25 through 29 at a time. If only one down pulse were provided, the resistor 20 would no longer be short circuited, and the resistor 25 would be short circuited. It will be seen that 10,000 ohms impedance would be between the output terminal and the upper limit reference terminal and 20,000 ohms impedance would be between the output and the lower limit reference terminal. Thus, the output would be between divisions 20 and 21 (counting from the lower limit reference terminal). Each step of the stepping switch SS1 moves the output down five divisions, that is five divisions closer to the lower limit reference terminal.

The stepping switch SS2 is operated by up pulses. As it is so operated, the impedance and voltage between the output and the lower limit reference terminal is increased and the impedance and voltage between the output and the upper limit reference terminal is decreased. Each up pulse moves the output in the up direction in steps of one division. Thus starting with the stepping switches in the home positions shown, if the arm SS2A moves up one step, there would then be 4,000 ohms impedance above the output and 26,000 ohms impedance below the output. The output would be between divisions 26 and 27 (counting from the lower limit reference terminal). It is to be noted that each division may represent any desired impedance depending on the magnitude of the resistors used, and that each division may represent any desired voltage depending on the magnitude of the resistors and the upper and lower limit reference signals. Also, each of the up and down steps may represent any desired number of divisions.

*Amplifier*

Figure 4:
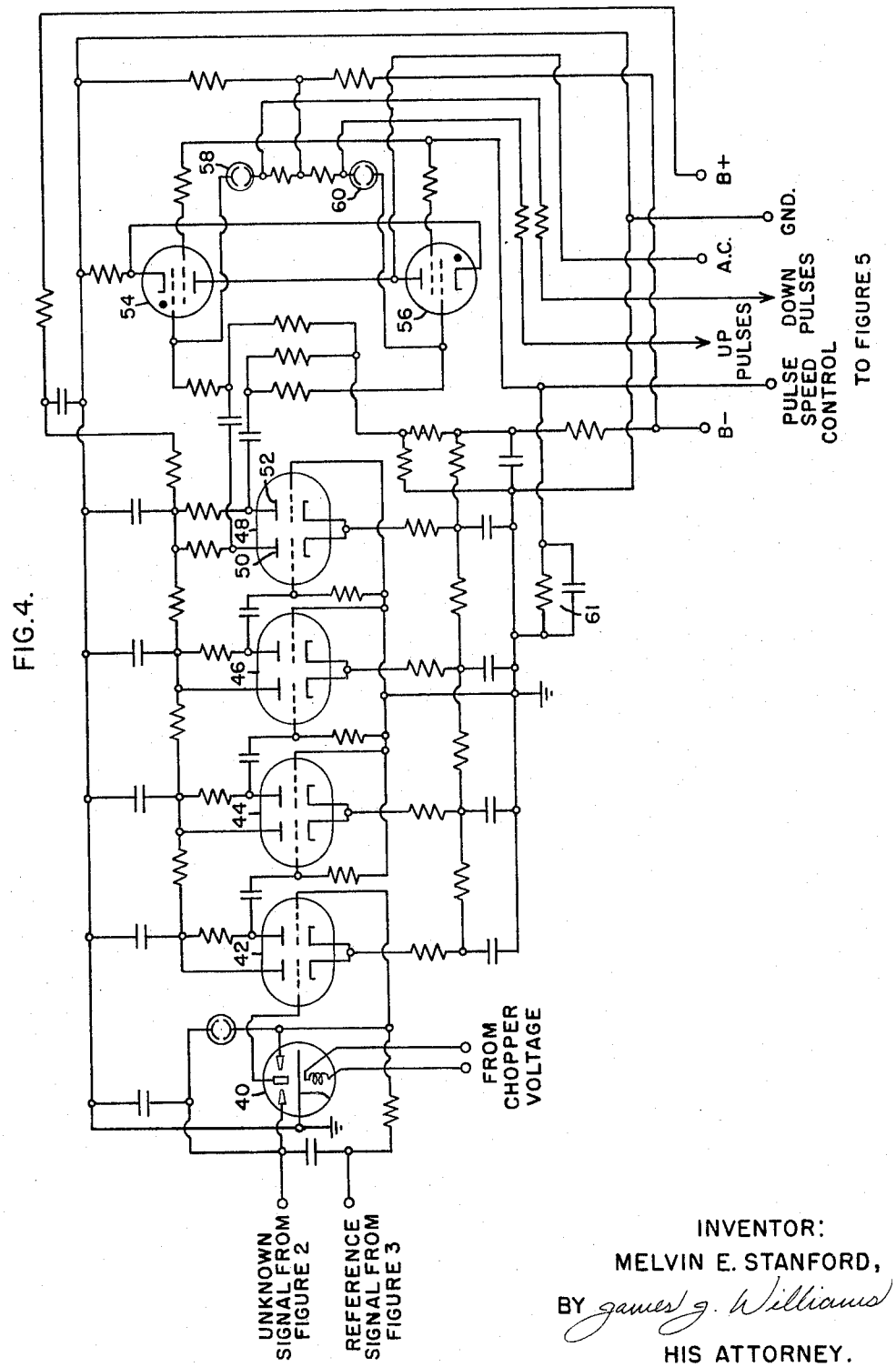
FIGURE 4 shows a schematic diagram of one embodiment of an amplifier which may be used in the block diagram of FIGURE 1.

The schematic diagram of the amplifier is shown in FIGURE 4. Unknown signals from the range switch of FIGURE 2 and reference signals from the precision divider of FIGURE 2 are respectively applied to the amplifier input terminals. These input terminals are respectively coupled to two stationary contacts of a chopper or vibrator 40 which operates conventionally from a suitable chopper voltage applied to its coil. The movable element of the chopper 40 alternately, and preferably at a 60 cycle rate, engages the two stationary contacts to which the unknown and reference signals are applied. This movable element is coupled to the grid of the first stage of a dual triode amplifier 42. This first stage is cathode coupled to the second stage of the amplifier 42, the grid of which is held at the reference signal level to reduce grid current. The output of the amplifier 42 is applied to the grids of a second amplifier 44, and the output of the second amplifier 44 is applied to the grids of a third amplifier 46. The output of the third amplifier 46 is applied to the grids of a phase separating amplifier 48 which is a dual triode amplifier tube. Although vacuum or gas-filled tubes are shown in the amplifier circuit of FIGURE 4, persons skilled in the art will appreciate that other devices, such as transistors, may also be used. The phase separating amplifier 48 has two outputs which are respectively derived from its two anodes 50, 52, these outputs being 180 degrees out of phase with respect to each other. The outputs on the anodes 50, 52 are substantially square wave in shape and vary between upper and lower levels. The outputs from the anodes 50, 52 are respectively coupled through capacitors to the first or control grids of power output tubes 54, 56. These tubes 54, 56 may be either vacuum tube tetrodes or gas-filled thyratron tubes as indicated. The capacitive coupling serves to differentiate the square wave outputs so that the power amplifiers 54, 56 have pulses or spikes of rapid rise and fall times applied to their respective control grids. The supply voltage applied to the anodes of the power amplifiers 54, 56 is an alternating current voltage, and conduction through the power amplifiers 54, 56 is determined by the polarity of this alternating current anode voltage relative to the cathode. Conduction is or may be also determined by the voltage on the respective second grids of the power amplifiers 54, 56. If these second grids are sufficiently negative, the amplifiers will not fire even though the control or first grids and anodes are positive. These second grids are supplied with a predetermined negative voltage from a resistor-capacitor network 61 which in turn is supplied with a negative voltage from a suitable source, in the drawing from the power amplifier of FIGURE 5. As will be explained, the network 61 and its source are designed in a preferred embodiment so that the power amplifiers 54, 56 conduct on alternate cycles rather than on each cycle when their respective anodes and control grids are positive.

If the second grids of amplifiers 54, 56 are not considered, when the anode is relatively positive at the time a positive pulse is applied to the control grid of a tube, that tube will conduct or fire. When a tube fires, its control grid voltage is effectively raised to the anode voltage and this increase in voltage is respectively coupled through one of the two neon tubes 58, 60 to provide the up or down pulses. Down pulses are produced when the reference signal is greater than the unknown signal because the anode 50 has the proper voltage level relative to the anode supply voltage for the amplififier tube 54. Up pulses are produced when the unknown signal is greater than the reference signal because the anode 52 has the proper voltage level relative to the anode supply voltage for the amplifier tube 56. These up and down pulses are applied to the power amplifier shown in FIGURE 5. As indicated in FIGURE 4, various voltages or connections are supplied in generally conventional fashion to the amplifier of FIGURE 4 from the power amplifier of FIGURE 5. These include a negative direct current voltage B—, a pulse speed control, an alternating current voltage, a ground or reference connection, and a positive direct current voltage B+.

Amplifier power supply

Figure 5:
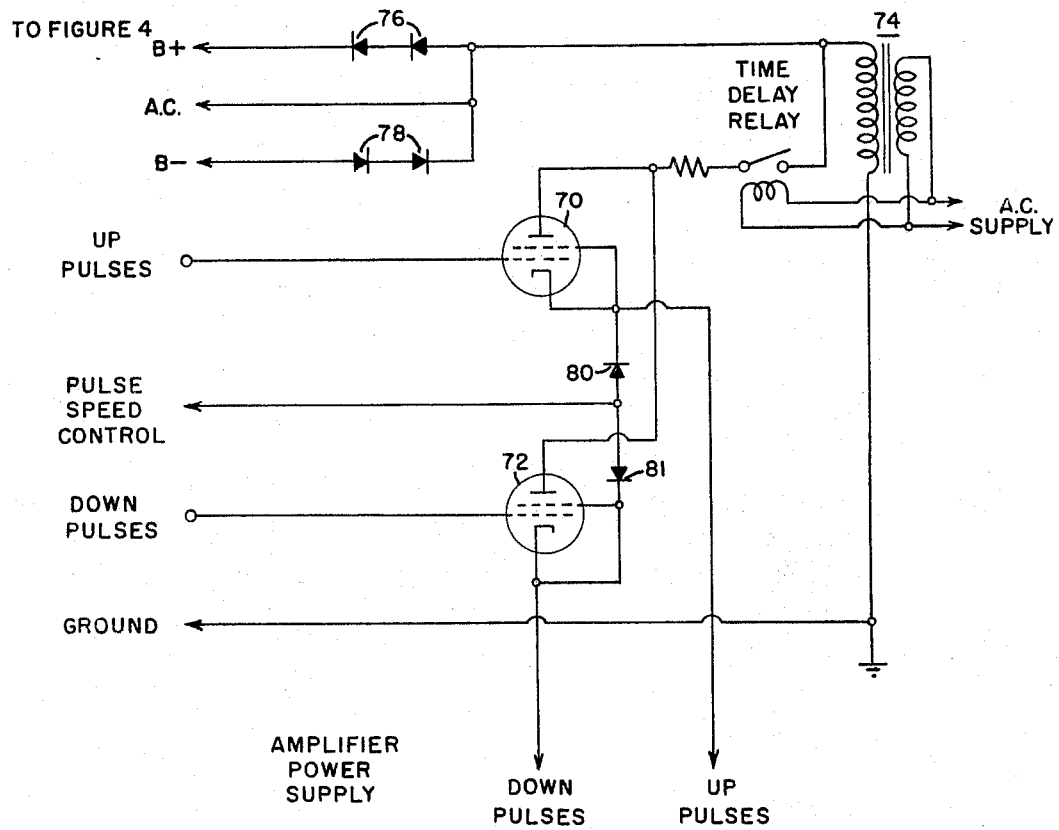
FIGURE 5 shows a schematic diagram of one embodiment of an amplifier power supply which may be used in the block diagram of FIGURE 1.

The schematic diagram of the amplifier power supply is shown in FIGURE 5. The up and down pulses are respectively applied to grids of suitable power amplifiers 70, 72 such as the vacuum tetrodes shown or thyratron tubes. An alternating current voltage is applied to the anodes of the amplifiers 70, 72 through a time delay relay from the secondary winding of a suitable transformer 74. The primary winding of the transformer 74 is coupled to an alternating current supply voltage. Conduction of the power amplifiers 70, 72 provides a cathode current which supplies the necessary or requisite power for the up and down pulses supplied to the logic circuitry of FIGURE 6. The voltages designated B+ and B— are provided respectively by rectifiers 76, 78 which are also coupled to the secondary winding of the transformer 74. The time delay relay is provided if needed to protect the power amplifiers 70, 72 until the cathodes are sufficiently heated (by means not shown). A pulse speed control output is provided by the amplifier power supply through two rectifiers 80, 81 which are respectively coupled between the pulse speed control output and the screen grids and cathodes of the amplifiers 70, 72. After one of the amplifiers 70, 72 ceases to conduct, its cathode becomes momentarily negative because of the inductive circuit effects. This negative condition is coupled through the respective one of the rectifiers 80, 81 to the pulse speed control output which in turn is coupled to the amplifier or FIGURE 4. As mentioned, this negative condition provides the negative voltage which may be used with the network 61 to prevent the power amplifiers 54, 56 from conducting every cycle.

Logic circuitry

FIGURE 6 shows the schematic diagram of the logic circuitry and the associated readout circuitry. For simplicity of explanation, the logic circuitry has been shown as utilizing mechanical stepping switches. The logic circuitry, as well as other portions of the device, may utilize relays or static devices such as transistor circuitry just as well with appropriate modifications. The actuating coils of the two stepping switches SS1 and SS2, mentioned earlier in connection with FIGURE 3, are shown. Stepping switch SS1 may be considered the down stepping switch and stepping switch SS2 may be considered the up stepping switch. In FIGURE 6, the down stepping switch SS1 has associated with it arms SS1C, SS1D, SS1E, and SS1F. There are five numbered positions and a home position H for each of these arms. Stepping switch SS2 has associated with it arms SS2B, SS2C, SS2D, SS2E, and SS2F. There are five or six numbered positions and a home position H for these arms as indicated. Relays 1 and 2 are also provided in the circuitry of FIGURE 6, these relays having the respective associated contacts shown and indicated by the relay number followed by a letter. Associated with each of the windings of the stepping switches SS1 and SS2 are interrupter circuits 92, 94 for the purpose of insuring that the stepping switches SS1 and SS2 return to their respective home positions H when the contacts 1D and 1E of the relay 1 are in their normal position. Such interrupter circuits are known and familiar to persons skilled in the art. A source of positive unidirectional potential B+ is provided by a conventional power supply 90 having a rectifier, filtering elements, and a source of alternating current power.

Down pulses are applied to the winding of the down stepping switch SS1 through arms SS2D and SS1F, and relay contacts 2A and 1D. Arm SS2D imposes the condition that down pulses can reach the winding of the down stepping switch SS1 if the up stepping switch SS2 has not stepped from its home position. Arm SS1F imposes an additional condition that down pulses can reach the winding of the down stepping switch SS1 if the down stepping switch SS1 has not stepped beyond position four. Contacts 2A impose an additional condition that down pulses can reach the winding of the down stepping switch SS1 if relay 2 is not energized. Contacts 1D impose an additional condition that down pulses can reach the winding of the down stepping switch SS1 if relay 1 is energized.

Up pulses are applied to the winding of the up stepping switch SS2 through arms SS1E and SS2E, and relay contacts 2B and 1E. Or, up pulses may be applied to the winding of the up stepping switch SS2 through arms SS1E and SS2F, and relay contacts 2B and 1E. Arm SS1E imposes the condition that up pulses can reach the winding of the up stepping switch SS2 only if the down stepping switch SS1 has not stepped from its home position. Arm SS2E imposes an additional condition that up pulses can reach the winding of the up stepping swtch SS2 if the up stepping switch SS2 has not stepped beyond position five. Arm SS2F imposes an additional condition that up pulses can reach the winding of the up stepping switch SS2 if the up stepping switch SS2 has not stepped beyond position four. Contacts 2B impose an additional condition that up pulses can reach the winding of the up stepping switch SS2 if relay 2 is not energized. Contacts 1E impose an additional condition that up pulses can reach the winding of the up stepping switch SS2 if relay 1 is energized.

Arm SS1F is provided to energize relay 2 if more than five down pulses are provided, and arm SS2F is provided to energize relay 2 if more than five up pulses are provided after one or more down pulses. The arm SS2E is included to accommodate the special case in which the unknown signal magnitude is greater than the reference signal magnitude and greater than the predetermined range. In this case, up pulses would be generated and the up stepping switch SS2 would take five steps at which point the cycle could normally be concluded. However, it is desirable to allow the up stepping switch SS2 to make a sixth step even though no further increase is possible in the reference signal magnitude. This sixth step prevents the readout of a division, which would be erroneous, by the arms SS2B and SS2C of the up stepping switch SS2. If one or more down pulses are first provided (i.e., before up pulses are provided), the special case mentioned does not exist. It will be recalled that if the reference signal magnitude originally exceeds the unknown signal magnitude, down pulses are first provided (until the reference signal magnitude is less than the unknown signal magnitude), after which up pulses are provided. Once up pulses are provided, except in the special case mentioned, it is presumed that the reference signal magnitude is within five divisions of the unknown signal magnitude (i.e., with a range of five steps of the up stepping switch SS2) and that no more than these five steps will be required.

Relay 1 is energised from the source of potential B+ through one of two paths labeled "start" and "reset." The start path goes to a control (not shown) which may provide a momentary completion of the circuit through the winding of relay 1, so that the winding becomes energized. When the winding of relay 1 is energized, its contacts 1A close and hold the relay 1 energized through the reset path which is normally connected to a return path for the source of potential B+. The reset path is provided with an arrangement whereby it may be momentarily broken so as to deenergize the winding of relay 1. Relay 2 is energized by the source of potential B+ through the contacts 1B, a resistor 96, and the contacts 2D. The winding of relay 2 is shunted by a capacitor 95 which is provided to hold the winding energized for a predetermined length of time despite the loss of energizing potential. The relay 2 may be also energized through its contacts 2D, a resistor 97, and the up and down pulses supplied through one or more of the stepping switch arms.

The output or utilized information is provided by arms SS1C, SS1D, SS2B, and SS2C which connect a common or return lead to division leads 1 through 10 and to range leads "low" and "high." These connections may be utilized as desired. No output is possible unless the up stepping switch SS2 is at one of its positions one through five. The output provided by arms SS2B and SS2C may respectively represent either divisions one through five or six through ten depending upon the location of arm SS1C. Thus, if the arm SS1C is at positions 1 or 3 or 5, arm SS2B is at positions 2 or 4, then arm SS2C represents divisions six through ten. The arm SS1D has contacts which indicate whether the reference signal magnitude is in a range higher or lower than the intermediate or preferred range. Thus, if the arm SS1D is at its home position H or position 1, a high range is indicated. If the arm SS1D is at its positions 2 or 3, then the intermediate or preferred range is indicated. If the arm SS1D is at its positions 4 or 5, a low range is indicated. In this way, a high range, a low range, and an intermediate or preferred range can be indicated, each range having ten divisions. Thus, effectively any one of 30 divisions can be indicated. Relay contacts 1C and 2C provide a circuit to indicate completion of a cycle.

*Operation*

Figure 7:
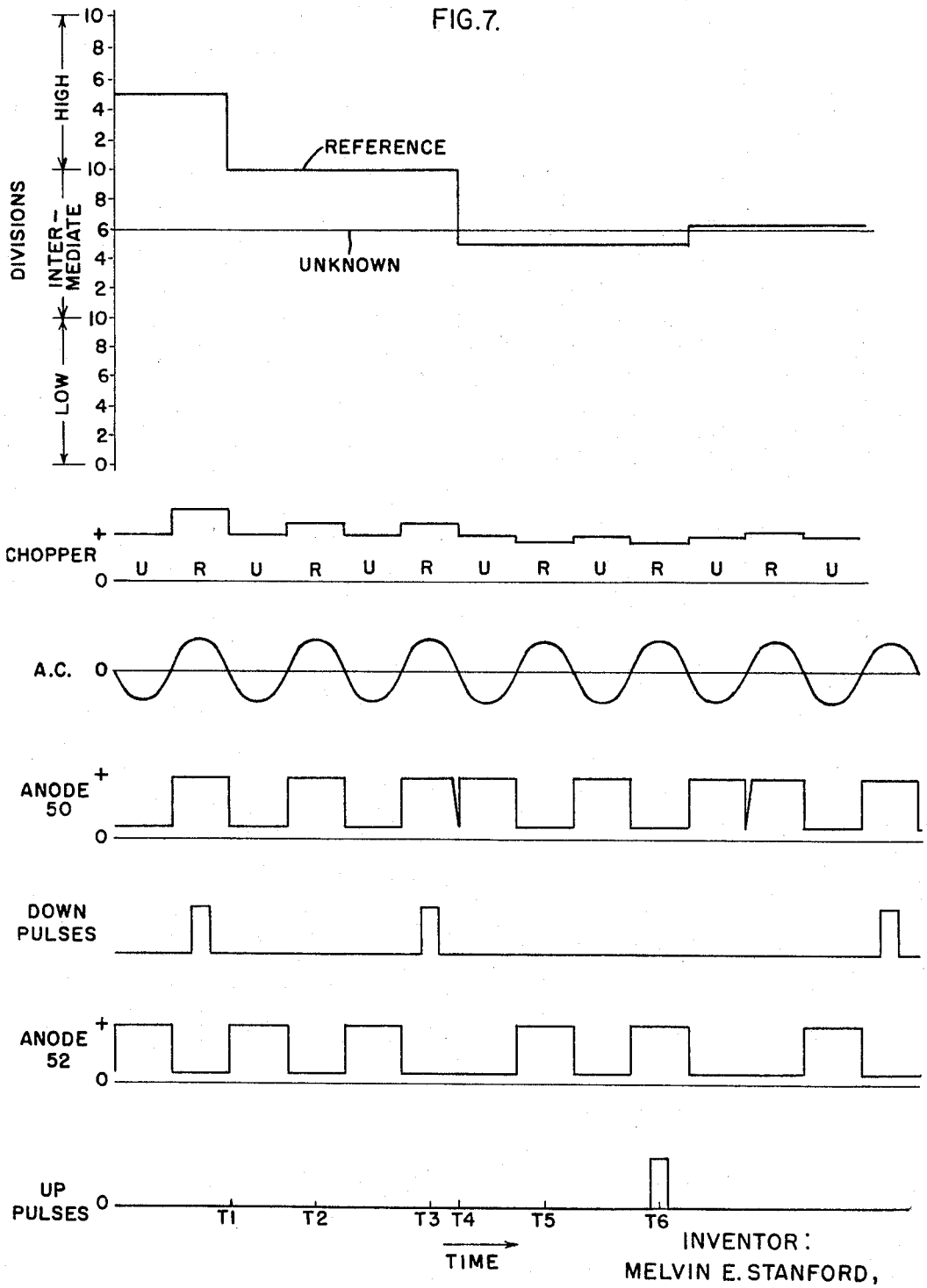
FIGURE 7 shows waveforms for the purpose of explaining the operation of the invention as embodied in the figures.

The operation of the classifying device will now be explained. In this explanation, reference may be had to FIGURE 6 which shows the logic circuitry and FIGURE 7 which shows waveforms (plotted against time) illustrating the operation of the various parts of the classifying device. For the purpose of explanation, it has been assumed that an unknown signal magnitude in the intermediate or preferred range has been provided by a device under test, and further that this unknown signal magnitude falls in division 6. From the standpoint of 30 divisions, this is equivalent to division 16. This unknown signal magnitude may have been divided by the factor of 10 or 100 by the range switch shown in FIGURE 2. The unknown signal magnitude is indicated in FIGURE 7 in the waveform labeled "Divisions." The reference signal magnitude is at the home or beginning division 25 (division 5 in the high range).

Operation is begun by applying a ground to the coil of relay 1 through the start lead by means of a control which may be either manual or automatic. Upon application of this ground, the coil of relay 1 is energized and locks itself in through contacts 1A which are connected to a reset lead that is normally grounded. Relay contacts 1B, 1C, 1D, and 1E move to their energized positions. The vibrator or chopper of FIGURE 4 starts operating at this time, and the movable element alternately engages the unknown and the reference signal magnitude inputs to provide a voltage shown by the waveform labeled "Chopper" in FIGURE 7. The time when the unknown and reference signals are sampled is indicated by "U" and "R" respectively. FIGURE 7 also shows the alternating current supply provided to the amplifier of FIGURE 4 and the amplifier power supply of FIGURE 5. The signals sampled by the chopper are amplified and appear at the anodes 50, 52 of the phase separating tube 48 as shown in FIGURE 7. During the time that either of the anodes 50, 52 (and hence the control grids of the power amplifiers 54, 56) is at a sufficiently high positive voltage, and the alternating current voltage on either of the anodes of the power amplifiers 54, 56 is positive, the power amplifier having the positive anode and control grid will fire. Since the reference signal is greater than the unknown signal, the power amplifier 54 fires to provide down pulses. Each of these down pulses is applied to the arm SS2D of FIGURE 6, and passes through arm SS1F and relay contacts 2A and 1D to the down stepping switch SS1. The first down pulse causes the arms of the down stepping switch SS1 to move to position one. Arms SS1A and SS1B (FIGURE 3) lower the reference signal five divisions to bring the reference signal down to 20 divisions. This is shown by the step in the reference signal at time T1.

At time T2, there is the proper relationship of the signals supplied to the power amplifier 54. However, the speed control pulses prevent any operation. Thus, it is not until the next proper relationship at time T3 that the second down pulse is provided. This second down pulse moves the down stepping switch SS1 to its second position so that the reference signal moves down to division 15 as shown at the time T4. At this time T4, the reference signal is now lower in magnitude than the unknown signal which is at 16 divisions (division 6 in the preferred range). Thus, at the next swing of the movable element of the vibrator 40, a voltage is sampled that in effect shifts the phase of the anodes 50, 52 of the phase separating tube 48. This is indicated at the time T4 in FIGURE 7 by the voltages for the anodes 50, 52. At time T5, the proper relationship of signals is present, but the pulse speed control circuit prevents an up pulse from being produced. Thus, it is not until the time T6 that an up pulse is provided. This up pulse is applied through arm SS1E which is in position two, arm SS2F which is in its home position, and through contacts 2B and 1E to the up stepping switch SS2. The up stepping switch SS2 moves to position one so that the reference signal (by arm SS2A) is at or just above division 16. If the reference signal were not above division 16, another up pulse would then be required, and the classification would indicate division 17. This is a matter of component and circuit tolerances which can be held to almost any limit by proper and careful design.

At this point, it should be noted that since the arm SS2D is now not at its home position, no further down pulses can be provided to the down stepping switch SS1. With the reference signal magnitude slightly above the unknown signal magnitude, the down pulses which will then be provided are applied through the resistor 97 to the winding of the relay 2. Upon application of pulses to this winding of relay 2 (the number of pulses may be one or more), the relay 2 is energized and causes its associated contacts to move to the energized position. Thus, contacts 2A and 2B are opened, contact 2C is closed, and contact 2D connects the winding of relay 2 (held energized by its capacitor) to the source of potential B+ and thus holds the winding of relay 2 energized. It will be seen that no further pulses can reach the stepping switches SS1 and SS2. The "complete" circuit is now closed through contacts 1C and 2C.

As will be recalled from the description immediately above, the down stepping switch SS1 received two pulses and the up stepping switch SS2 received one pulse. Thus, the common lead of the readout circuit is connected to arm SS2C through position 2 of arm SS1C and is connected to position 2 of arm SS1D. And, arm SS2B is at position 1 and arm SS2C is at position 1. However, the common lead is not connected to arm SS2B but is connected to arm SS2C. With arm SS2C at position 1, it will be seen that the common lead is connected through arm SS1C, its position 2, arm SS2C and its position 1 to division six. Since neither the low nor high range leads are connected to the common lead by the arm SS1D, division six is in the intermediate range (division 16 from a 30 division standpoint). Thus, the unknown has been classified in a division which confirms the selected unknown shown in FIGURE 7 and previously assumed. After the output has been utilized, the reset lead may be opened to restore the circuits to their original condition, including the stepping switches to their home position, so that another unknown signal may be classified.

If the unknown signal had been sufficiently low such that the down stepping switch SS1 had moved to positions 4 or 5, the common lead would be connected through arm SS1D to positions 4 and 5 which provide a low designation. On the other hand, if the unknown signal had been too high, or out of the middle range, only the up stepping switch SS2 would have operated. Thus, the down stepping switch SS1 would remain in its home position and the common lead would be connected through arm SS1D to position home or 1 to the high lead. Thus, it will be seen that a high, low, or intermediate indication as well as a division indication can be given.

Persons skilled in the art will appreciate the numerous changes and variations which may be made in the circuit described above. For example, it is not necessary that 30 divisions be utilized, but any number of divisions, within practical reason, may be provided. Also, the home position of the reference signal may be at any suitable division, and the reference signal may be varied up or down in steps of any number of divisions which are suitable. Further, any division arrangement of high, intermediate, and low may be provided also, depending upon the function that the circuit is to provide. Also, static devices may be used in place of the mechanical devices at appropriate places. And, numerous other variations and changes will be recognized by persons skilled in the art. In any event, it is to be understood that modifications may be made by persons skilled in the art without departing from the spirit of the invention or from the scope of the claims.

What I claim as new and desire to secure by Letters Patent of the United States is:

1. A device for classifying an unknown signal magnitude in one of a plurality of reference signal divisions between upper and lower limits comprising:
    (a) reference means for producing said plurality of reference signal divisions between said upper and lower limits,
    (b) variable means for selecting one of said reference signal divisions,
    (c) comparison means having a reference signal division input, an unknown signal input, a down pulse output, and an up pulse output,
    (d) means for applying upper and lower limits to said reference means,
    (e) means for coupling said variable means to said reference signal division input,
    (f) means for coupling an unknown signal to said unknown signal input,
    (g) said comparison means being adapted to produce down pulses at said down pulse output in response to a reference signal division greater than an unknown signal and to produce up pulses at said up pulse output in response to an unknown signal greater than a reference signal division,
    (h) down switching means having a down pulse input and a down control output,
    (i) up switching means having an up pulse input and an up control output,
    (j) means for coupling said down pulse input to said down pulse output and for coupling said up pulse input to said up pulse output,
    (k) means for coupling said down control output and said up control output to said variable means for controlling the operation of said variable means in response to the operation of said down and up switching means,
    (l) indicator means,
    (m) and means coupling said down and up control outputs to said indicator means.

2. The device as defined in claim 1 wherein said down and up switching means include means for inactivating both said switching means in response to more than a predetermined number of down pulses, and for inactivating both said switching means in response to more than a predetermined number of up pulses after at least one down pulse.

References Cited by the Examiner
UNITED STATES PATENTS

| | | | |
|---|---|---|---|
| 2,775,754 | 12/1956 | Sink | 340—347 |
| 2,836,356 | 5/1958 | Forrest et al. | 340—347 |
| 2,940,071 | 6/1960 | Kindred | 340—347 |
| 2,972,126 | 2/1961 | Hecox et al. | 324—99 |
| 3,005,156 | 10/1961 | Hoberman | 324—99 |
| 3,163,849 | 12/1964 | Meyer | 340—146.2 |
| 3,217,293 | 11/1965 | Metz | 340—146.2 |

MALCOLM A. MORRISON, *Primary Examiner.*

M. J. SPIVAK, C. L. WHITHAM, *Assistant Examiners.*